United States Patent
Tomida

(10) Patent No.: US 7,360,469 B2
(45) Date of Patent: Apr. 22, 2008

(54) SHIFT LEVER

(75) Inventor: Shigetoshi Tomida, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 374 days.

(21) Appl. No.: 11/120,189

(22) Filed: May 3, 2005

(65) Prior Publication Data

US 2005/0247159 A1 Nov. 10, 2005

(30) Foreign Application Priority Data

May 6, 2004 (JP) .............................. 2004-137587

(51) Int. Cl.
*G05G 5/06* (2006.01)

(52) U.S. Cl. .................... 74/537; 74/538; 74/473.3

(58) Field of Classification Search ............... 74/473.1, 74/473.21, 473.3, 523, 529, 537, 538, 539, 74/491

See application file for complete search history.

(56) References Cited

U.S. PATENT DOCUMENTS

| | | | | |
|---|---|---|---|---|
| 5,575,174 A | * | 11/1996 | Kanematsu et al. | 74/473.23 |
| 5,617,760 A | * | 4/1997 | Woeste et al. | 74/473.23 |
| 6,435,052 B1 | * | 8/2002 | Ersoy et al. | 74/473.1 |
| 6,732,608 B2 | * | 5/2004 | Suzuki | 74/473.3 |
| 2002/0062709 A1 | | 5/2002 | Suzuki | |
| 2005/0011293 A1 | * | 1/2005 | Kondou et al. | 74/473.1 |
| 2006/0053929 A1 | * | 3/2006 | Tomida | 74/473.12 |

FOREIGN PATENT DOCUMENTS

| JP | 11-151944 | 6/1999 |
|---|---|---|
| JP | 2002-2321 | 1/2002 |

* cited by examiner

*Primary Examiner*—Richard Ridley
*Assistant Examiner*—Matthew A. Johnson
(74) *Attorney, Agent, or Firm*—Roberts, Mlotkowski & Hobbes; Thomas W. Cole

(57) ABSTRACT

A shift lever includes: a knob having a opening, which is mounted on the distal end of the lever main body; a moving body, movably arranged in the interior of the lever main body with one end protruding from the opening thereof and is placed in the interior of the knob; an operating unit, which is movably accommodated in the opening portion of the knob; and a link member that is provided in the knob turnably around an axis that is the center of a predetermined region of the base end side; an engaging pin provided at one of the operating unit and the link member; and guide grooves provided such that the engaging pin can be placed in the other of any one of the operating unit and the link member, where from one end in the longitudinal direction to the other end is curved.

18 Claims, 3 Drawing Sheets

SHIFT LEVER

CROSS-REFERENCE TO RELATED APPLICATION

This application claims priority under 35 U.S.C. 119 from Japanese Patent Application No. 2004-137587, the disclosure of which is incorporated by reference herein.

BACKGROUND OF THE INVENTION

1. Field of the Invention

The present invention relates to a shift lever for operating the transmission of a vehicle and the like.

2. Description of the Related Art

Automatic transmissions for vehicles are preset with multiple shift ranges, and vehicles are provided with manual operating devices for operation of selection of these shift ranges. An example of this type of manual operating device is what is known as a straight-type shift lever device.

A straight-type shift lever device is equipped with a shift lever, which is supported at a preset region of the base end side in the longitudinal direction so as to be turnable around an axis whose axial direction runs substantially in the left-to-right directions of the vehicle. The turning positions of the shift lever are detected by, for example, a position detecting device such as a microswitch, and the electronic control unit (ECU) that controls the automatic transmission is configured to change the shift range of the automatic transmission based on the detection results of the position detecting device.

This type of shift lever is provided with a detent structure that prevents the shift lever from inadvertently moving, for example, from the shift position corresponding to the neutral range that cuts off transmission of the engine driving force to the wheels (hereafter, this position is referred to as "N-position") to the shift position corresponding to the reverse range that conveys the engine driving force to the wheels and makes the vehicle reverse (hereafter, this position is referred to as "R-position").

The detent structure is equipped with a detent rod, which is provided in the interior of the shift lever so as to be movable along the longitudinal direction of the shift lever. A detent pin is formed to protrude from the base end side of the longitudinal direction of the detent rod. The detent pin protrudes towards the exterior of the shift lever and is inserted into a detent hole formed in the housing of the shift lever device.

When the shift lever is operated and turned, the detent pin turns with the shift lever in the interior of a shift hole. When the shift lever is in a state where the shift lever has reached the N-position, a protrusion formed in the inner periphery of the detent hole is opposite of the turning direction side of the detent pin when the shift lever turns to the R-position. When trying to turn the shift lever towards the R-position as is in this state, the protrusion interacts with the detent pin and restricts the turning of the detent pin and thus the turning of the shift lever.

A gripping knob provided at the end of the shift lever is equipped with a button. When this button is operated and pressed, the detent rod moves towards the base end side of the shift lever, whereby the detent pin is placed in a condition where it can avoid the aforementioned protrusion. When turning the shift lever from the N-position to the R-position, the protrusion does not interact with the detent pin, and is configured such that the shift lever can be turned from the N-position to the R-position.

The structure of such a shift lever equipped with a button is disclosed in Japanese Patent Application Laid-Open (JP-A) No. 11-151944.

With the shift lever disclosed in JP-A No. 11-151944, a knob button is turnably supported at a supporting axis provided at the inside of the shift knob (knob) at an opening end in the upper portion of the knob. The opening portion of a long rectilinear hole is formed at the side opposite of the pressing surface through the supporting axis of the knob button.

Further, a substantially "<" shaped bent lever is provided at the interior of the shift knob. The lever has a supporting axis set at the bent portion, and is configured so as to be turnable around the center of the supporting axis. A pin is provided at the arm of the opposite side rather than at the crooked portion of the lever. This pin is inserted or placed into the above-described opening portion.

At the same time, one end of a wire corresponding to the above detent rod is latched at the other side at the arm rather than at the bent portion of the lever.

With this shift lever, when the pressing surface of the knob button is pressed, the knob button turns around the supporting axis. When the knob button turns, the inner wall of the opening portion presses and raises a pin and turns the lever around the supporting axis. Due to this, the other arm of the lever is configured to pull the wire.

In the shift lever disclosed in JP-A No. 11-151944, with the increase in the amount of turn of the knob button when the pressing surface of the knob button is pressed, the distance from the center of turning of the knob button to the region where the inner wall of the opening and the pin contact shortens. In other words, the length of the moment arm shortens, whereby it is possible to suppress increases in the necessary pressing force with increases in the amount of turning of the knob button.

Nonetheless, with this type of structure, the rate of change of the distance from the center of turning of the knob button to the region where the inner wall of the opening and the pin contact becomes great, and a sufficient effect cannot be exhibited. Further, in order to suppress increases in the necessary pressing force by shortening the distance from the center of turning of the knob button to the region where the inner wall of the opening and the pin contact, it is necessary to make the distance from the center of turning of the knob button to the region where the inner wall of the opening and the pin contact sufficiently long. This must be done in a state prior to the application of pressing force (i.e., before the knob button turns). For this reason, problems occur such as the size of the knob becoming larger.

SUMMARY OF THE INVENTION

The present invention has been made in light of the above circumstances and provides a shift lever that does not require increasing the size of the knob. With the present invention, the weight felt when the operating unit is operated and pressed can be set to a proper amount.

A first aspect of the present invention is a shift lever that operates a transmission by moving a hollow-shaped lever main body whose distal end is open comprising: a knob, which is mounted on the distal end portion of the lever main body, having an opening portion; a moving body, provided in the interior of the lever main body, movable along the opening direction of the opening of the lever main body where one end protrudes from the opening of the lever main body and is placed in the interior of the knob; an operating unit, at least one part of which is accommodated in the opening portion of the knob, that is movable in the interior and exterior directions relative to the knob; a link member having a distal end and a base end and provided in the knob turnably around an axis that is the center of a predetermined region of the base end side; an engaging pin provided at any one of the operating unit and the link member; and a guide groove provided such that the engaging pin can be placed in the other of any one of the operating unit and the link member, where one end in the longitudinal direction and the other end are closed and at least one portion of the region from one end in the longitudinal direction to the other end is curved or bent; wherein the engaging pin moves from one longitudinal end side to the other end side of the guide groove with the movement of the operating unit, and the distal end side presses one end of the moving body and moves the moving body by the link member turning in one turning direction around the axis by the movement of the engaging pin.

With the above-described configuration of the shift lever, the knob is mounted on the distal end portion of the lever main body. When the knob is gripped and the lever main body is moved to a predetermined shift position, the shift range and gears of the vehicle transmission change in accordance with shift position of the lever main body (i.e., the present shift lever).

Further, the shift lever is equipped with an engaging pin on either the operating unit provided at the knob or the link member provided at the interior of the knob. This engaging pin is placed in guide grooves provided on the other, i.e., either the operating unit or the link member.

If the engaging pin is provided at the operating unit, when the operating unit is moved in one of an exterior or interior direction of the knob, the engaging pin continues to move from one end of the guide grooves in the longitudinal direction to the other and presses the inner walls of the guide grooves. In this manner, the inner walls of the guide grooves receive pressing force from the engaging pin, whereby the link member, provided at the guide grooves, turns as the base end side as the center.

In contrast, if the guide grooves are provided at the operating unit, when the operating unit is moved in one of an exterior or interior direction of the knob, the inner walls of the guide grooves press the engaging pin positioned at one end of the guide grooves in the longitudinal direction and moves it to the other end of the guide grooves in the longitudinal direction. In this manner, the link member having the engaging pin is turned with the base end side as the center by movement of the engaging pin to the other end side of the guide grooves.

One end of the moving body protruding from the distal end of the lever main body is placed into the interior of the knob. When the link member is turned as above, one end of the moving body is pressed by the distal end of the link member, whereby the moving body moves towards the base end side of the lever main body. When the moving body is a so-called detent rod, movement restriction of the lever main body is freed by the above-described movement of the detent rod, and the lever main body can be moved to the desired shift range.

The weight felt when operating the operating unit increases or decreases depending on the angle of the movement of direction of the operating unit relative to the tangential direction of the exterior portion of the engaging pin in the region where the engaging pin and the inner walls of the guide grooves contact. Here, with the shift lever of the present invention, at least one portion of the guide grooves is bent or curved from one end to the other. Due to this, the angle of inclination of the movement direction of the operating unit relative to the above tangential direction can be set at a desired angle, and the weight felt when operating the operating unit can be set at the proper weight.

Further, even when the movement of the operating unit is rotation, it is not necessary to change the distance of the contact region from the turning center of the operating unit to the inner walls of the guide grooves in order to make it larger. For this reason, increases in the size of the knob can be suppressed.

A second aspect of the present invention is a shift lever that operates a transmission by moving a hollow-shaped lever main body whose distal end is open comprising: a knob, which is mounted on the distal end portion of the lever main body, having an opening portion; a moving body movably arranged in the interior of the lever main body, one end of which is urged so as to protrude from the opening of the lever main body; a supporting body that is accommodated within the opening portion of the knob and which has a pair of first supporting pieces and a pair of second supporting pieces protruding towards the opening of the opening portion; a link member having a distal end and a base end where the second supporting pieces are axially supported to be turnable in the base end side and where the distal end is arranged so as to be engageable with the protruding portion of the moving body; an operating unit, which is axially supported by the first supporting pieces, at least one part of which is accommodated in the opening portion, and provided so as to be turnable in the interior and exterior directions of the knob relative to the knob; an engaging pin provided at any one of the operating unit and the link member; a guide groove provided such that the engaging pin can pass through the other of any one of the operating unit and the link member, where one end in the longitudinal direction and the other end are closed, and at least one portion of the region from one end in the longitudinal direction to the other end is curved or bent; wherein the engaging pin moves from one longitudinal end side to the other end side of the guide groove with the movement of the operating unit, and the distal end side presses one end of the moving body and moves the moving body by the link member turning in one turning direction around the axis by the movement of the engaging pin.

DETAILED DESCRIPTION OF THE INVENTION

Structure of the Present Embodiment

The structure of the relevant portion of a shift lever 10 of the first embodiment of the present invention is shown in Fig in a perspective view. 1. Further, the structure of the relevant portion of the present shift lever 10 is shown in FIG. 2 in a cross-sectional view.

Figure 1:
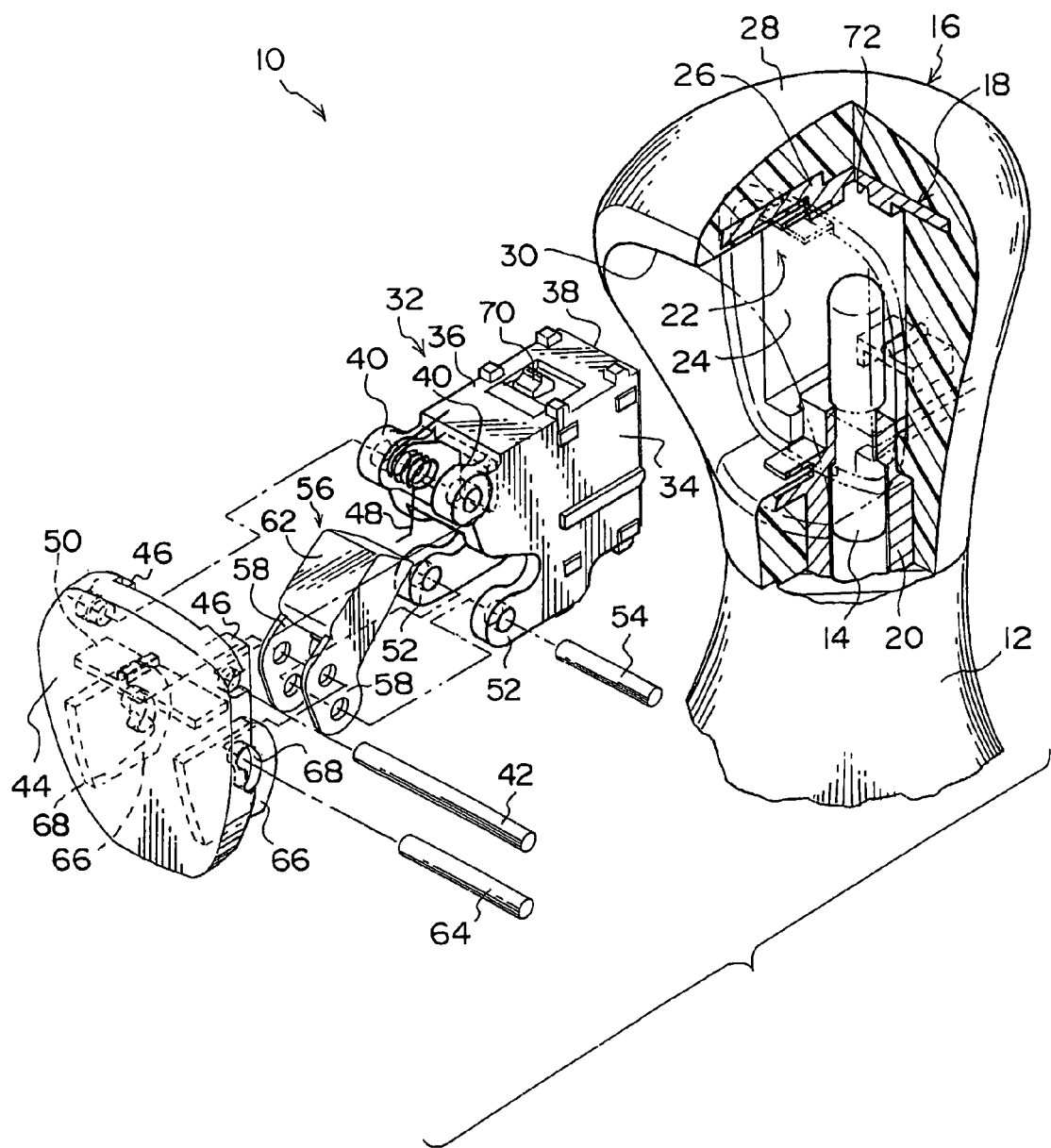
FIG. 1 is a perspective view showing the exploded portion of the relevant part of the shift lever of an embodiment of the present invention.
Figure 2:
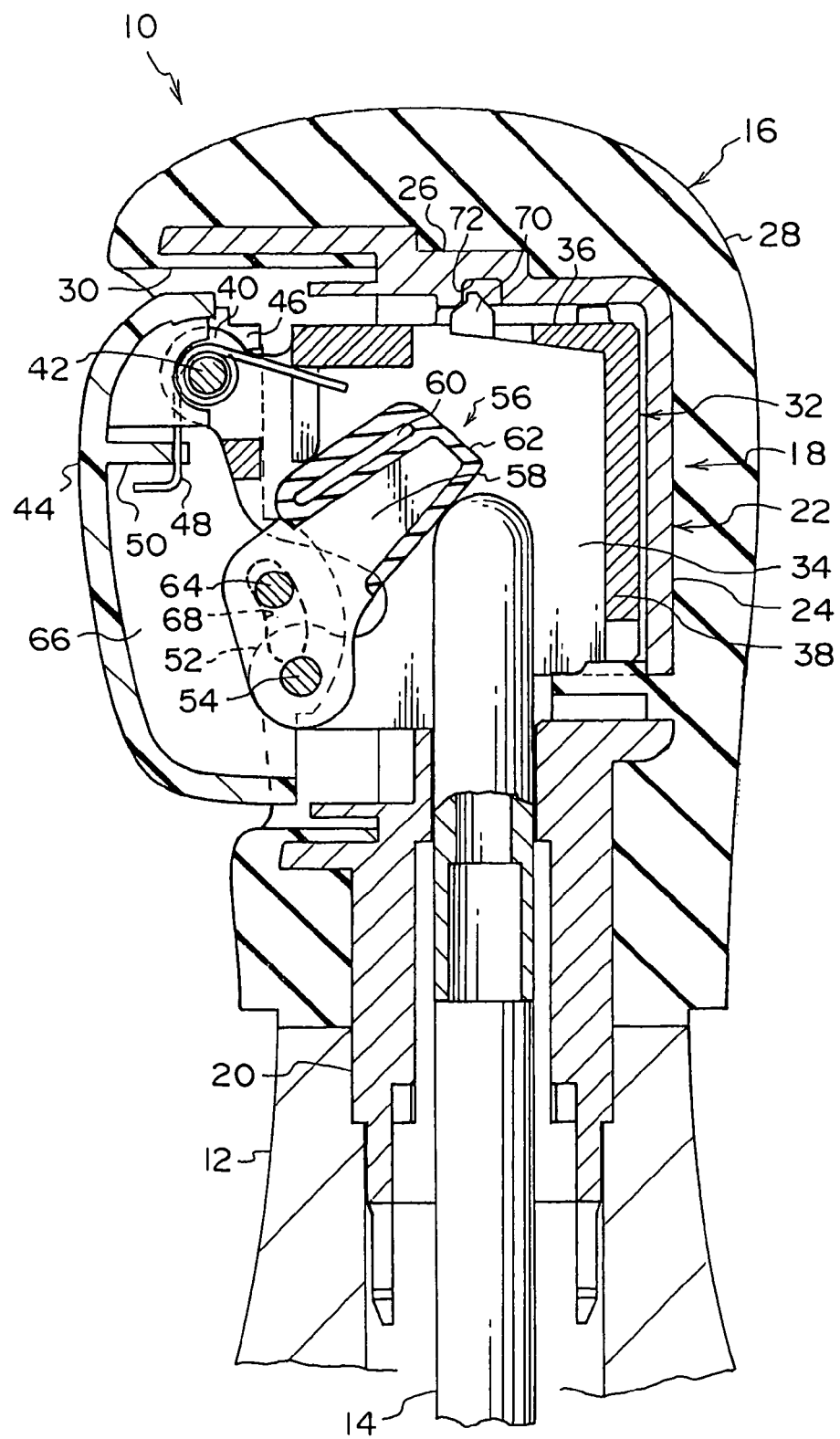
FIG. 2 is a cross-sectional view of the relevant part of the shift lever of the embodiment of the present invention.

As shown in FIGS. 1 and 2, the shift lever 10 is provided with a lever main body 12, the interior of which is formed in a hollow tubular shape from a synthetic resin material or metal material.

Detailed diagrams have been omitted, however, the base end side of the lever main body 12 (the lower side of FIG. 2) is inserted into, for example, an approximately box-shaped housing mounted on the vehicle. Due to a shaft, both ends of which are supported by side walls of the housing, the lever main body 12 is axially supported so as to be turnable (rotatable) around an axis whose axial direction is designated to be, for example, the vehicle's approximate left-right directions.

Further, as shown in FIGS. 1 and 2, a detent rod 14 acting as a moving body is accommodated inside the lever main body 12 so as to be movable along the longitudinal direction of the lever main body 12. In this longitudinal direction, one end portion of the detent rod 14 (the upper end portion in FIG. 2) protrudes from an opening end formed in the distal end portion of the lever main body 12 (the upper end portion in FIG. 2).

The interior of the lever main body 12 is closed at the base end side. A compression coil spring (not shown) is arranged between the inner lower portion and the detent rod 14. The detent rod 14 is urged against the distal end of the lever main body 12 (i.e., the upper side of FIG. 2) due to the urging force of this compression coil spring.

Further, a detent pin (not shown) is formed to protrude from the base end side in the longitudinal direction of the detent rod 14. The detent pin passes through a slit hole (not shown) formed at the base end side of the lever main body 12 and protrudes to the exterior of the lever main body 12.

A detent hole (not shown) corresponding to the distal end side of the detent pin protruding from the lever main body 12 is formed in the side wall of the above-mentioned housing. The distal end side of the detent pin is placed inside the detent hole. A protruding portion (not shown) is formed in the interior periphery of the detent hole at a predetermined region on a surface facing downwards (more specifically, at the center side of the turning radius direction of the lever main body 12). When the lever main body 12 reaches a predetermined turning (rotating) position (shift position) the lever main body 12 is opposite the protruding portion and the detent pin along the turning peripheral direction.

In this manner, when the lever main body 12 is made to turn where the protruding portion and the detent pin oppose each other, the protruding portion interacts with the detent pin, whereby it restricts the turning of the detent pin and thus the turning of the lever main body 12.

However, when it resists the urging force of the above-described compression coil spring, and the detent rod 14 is moved towards the base end of the lever main body 12, the opposing state with the protruding portion of the detent pin is released. When the lever main body 12 is turned in this state, the detent pin avoids the protruding portion, thus making the structure such that the lever main body 12 can be turned.

Meanwhile, as shown in FIGS. 1 and 2, a knob 16 is provided at the distal end of the lever main body 12 and the knob 16 has a base 18. The base 18 is formed from a metal or a relatively hard synthetic resin material. The base 18 is equipped with a tubular portion 20, which is formed into a tubular shape open at both ends.

At a side of one end slightly away from the intermediate portion of the penetrating direction of the tubular portion 20 (lower side of FIG. 2) is inserted into the interior of the lever main body 12 from the opening end of the lever main body 12 and is mechanically connected thereto. One end side of the detent rod 14 is inserted into the tubular portion 20.

The base 18 is provided with a retaining portion 22. The retaining portion 22 is provided with an opened main body 24 which opening faces one direction perpendicular to the penetrating direction of the tubular portion 20 (the up-down direction in FIG. 2). The main body 24 uniformly connects with the other end (upper end) of the tubular portion 20 having a predetermined space. Further, a retaining wall 26 is continuously formed with the upper end portion of the main body 24 and the upper end portion of the main body 24 is closed off by the retaining wall 26.

A covering portion 28 is provided at the exterior side of the base 18, which is configured from the tubular portion 20 and the retaining portion 22. The covering portion 28 is formed from a synthetic resin material softer than the base 18 into a shape that is easy for the vehicle operator to grip. Further, an opening 30 is formed in the covering portion 28. The opening 30 opens along the opening direction of the main body 24, and a supporting body 32 is inserted and fitted through this opening 30.

The supporting body 32 is provided with a pair of side walls 34. Each of the pair of side walls 34 are provided opposite each other in a direction that is perpendicular to both the penetrating direction of the tubular portion 20 and the opening direction of the above-described main body 24.

Further, the supporting body 32 is provided with an upper wall 36 and a vertical wall 38. The upper wall 36 is provided along the upper portions of the pair of side walls 34. The vertical wall 38 is provided at one end along the widthwise directions of the pair of side walls 34 (i.e., the side opposite from the opening direction of the main body 24). The pair of side walls 34 is thus uniformly connected in a state where a constant space is maintained by this upper wall 36 and vertical wall 38.

Supporting pieces 40 (first supporting pieces) are provided in the vicinity of the upper end portions of the pair of side walls 34 and the vicinity of the opening 30. A shaft 42 is provided at these supporting pieces 40. Along the longitudinal direction, the side of one end of the shaft 42 is passed through one supporting piece 40 and protrudes from the opposite side of the other supporting piece 40. Further, the other end side in the longitudinal direction of the shaft 42 passes through the other supporting piece 40 and protrudes from the opposite side of the other supporting piece 40. That is, the shaft 42 is provided such that it passes through one supporting piece 40 and the other supporting piece 40 in a state where both ends of the shaft 42 protrude from each of the supporting pieces 40.

A button 44 is mounted on this shaft 42 as an operating portion. A pair of mounting pieces 46 is formed in the vicinity of the upper end portion of the button 44. These mounting pieces 46 are set opposite each other along the axial direction of the shaft 42. Each of the ends of the shaft 42 is placed, one each, in the pair of mounting pieces 46 at the exterior sides of the above-described pair of supporting pieces 40.

Due to this configuration, the button 44 is supported by the shaft 42 so as to be turnable around the shaft 42. When the button 44 is pressed towards the interior side of the opening direction of the opening 30, the button 44 turns around the shaft 42 and the lower end side of the button 44 moves to enter the inner side of the knob 16 from the opening 30.

Further, a return spring 48 acting as an urging member is provided at the shaft 42. One end of the return spring 48 is retained to a retaining piece 50 formed at the button 44 while the other end is retained to the upper wall 36 such that, as described above, when the button 44 is turned so as to enter the interior side of the knob 16, it applies force or urges in the direction opposite of the turning, i.e., towards the exterior side of the knob 16.

Meanwhile, supporting pieces 52 (second supporting pieces) are provided in the vicinity of the lower end portions of the pair of side walls 34 and the vicinity of the opening 30. One end of a shaft 54 is supported by one of these supporting pieces 52, and the other end of the shaft 54 is supported by the other supporting piece 52. The shaft 54 is provided so as to be parallel to the shaft 42. A link member 56 arranged between the above-described pair of side walls 34 is turnably supported by this shaft 54.

The link member 56 is provided with a pair of side walls 58. These side walls 58 face each other along the direction of the side walls 34, which face each other oppositely. The shape of the end surfaces of these side walls 58 are bent so as to have a substantially "<" shape and the above-described shaft 54 passes through closer towards the ends away from the bent portion.

Further, a connecting wall 60 is provided at a portion of one end in the widthwise direction away from the curved or bent side walls 58. The pair of side walls 58 is thus uniformly connected in a state where a predetermined space is maintained by this connecting wall 60. Further, the other end side (not the bent portions of the side walls 58) is covered by a pressing portion 62.

The pressing portion 62 is formed from a synthetic resin material having the rigidity of a comparatively hard rubber material. When the side walls 58 turn around one direction of the shaft 54 (i.e., the link member 56) the pressing portion 62 resists the urging force of the above-described compression coil spring and presses the detent rod 14 down towards the base end side of the lever main body 12.

Further, an engaging pin 64 parallel to the shaft 42, 54 passes through bent portions of the side walls 58. A pair of guide walls 66 corresponding to the engaging pin 64 is formed at the button 44. The guide walls 66 face each other along the direction of the above-described side walls 34, 58, which each face each other.

Guide grooves 68 are formed in these guide walls 66. The inner width dimensions of these guide grooves 68 are only minutely larger than the outer diameter dimensions of the above engaging pin 64. Both end portions of the engaging pin 64, which protrude from the exterior sides of the pair of side walls 58, are placed in the interiors of the guide grooves 68. Due to this, the button 44 and the link member 56 are mechanically connected.

In this manner, both ends of the engaging pin 64 placed in the guide grooves 68 are movable from one end of the guide grooves 68 in the longitudinal direction to the other end relative to the button 44. However, movement of the engaging pin 64 whose ends are placed in the guide grooves 68 along the widthwise directions of the guide grooves 68 relative to the button 44 is limited by intervention with the inner walls of the guide grooves 68. Further, these guide grooves 68 are curved from one end to another in the longitudinal direction with a predetermined curvature with a predetermined region of the opening 30 as the center.

The supporting body 32, having mounted thereon this type of button 44 and link member 56, is inserted and fitted into the knob 16 from the opening 30. An elastic meshing piece 70 formed on the upper wall 36 of the supporting body 32 fits with a fit-in hole 72 formed in the retaining portion 22, whereby it is configured to be retained from moving towards the exterior side of the opening 30 attached to the knob 16.

Operation and Effects of the Present Embodiment

Next, operation and effects of the present embodiment will be explained.

The present shift lever 10, when turned on the axis support portion of the base end side in a state where the knob 16 is gripped, reaches preset turning positions (shift positions) whereby the turning positions of the lever main body 12 are detected by a position detecting device provided in the above-described housing such as a magnetic sensor (e.g., a Hall element) or a microswitch and the like. An electrical signal corresponding to the detection results of the turning position of the lever main body 12 in the position detecting device is inputted into a ECU, which controls the automatic transmission. The shift range of the automatic transmission is changed in the ECU in accordance with the inputted electrical signal (i.e., the detection results regarding the turning position of the lever main body 12).

So, for example, when the lever main body 12 is in a state where it has reached the shift position corresponding to the neutral range that cuts off transmission of the engine driving force to the wheels (hereafter, this position is referred to as "N-position") and the lever main body 12 is turned to the shift position corresponding to the reverse range that conveys the engine driving force to the wheels and makes the vehicle reverse (hereafter, this position is referred to as "R-position") the turning trajectory (locus) of the detent pin at this time, where a protruding portion formed in the detent hole is positioned opposite the detent pin.

In this state, if the operator were to try to simply turn the lever main body 12 to the R-position, the protruding portion of the detent hole would contact the detent pin, thereby restricting turning of the detent pin. By restricting the turning of the detent pin in this manner, turning of the lever main body 12 to the R-position is restricted, whereby inadvertent turning of the lever main body 12 from the N-position to the R-position can be prevented.

Figure 3:
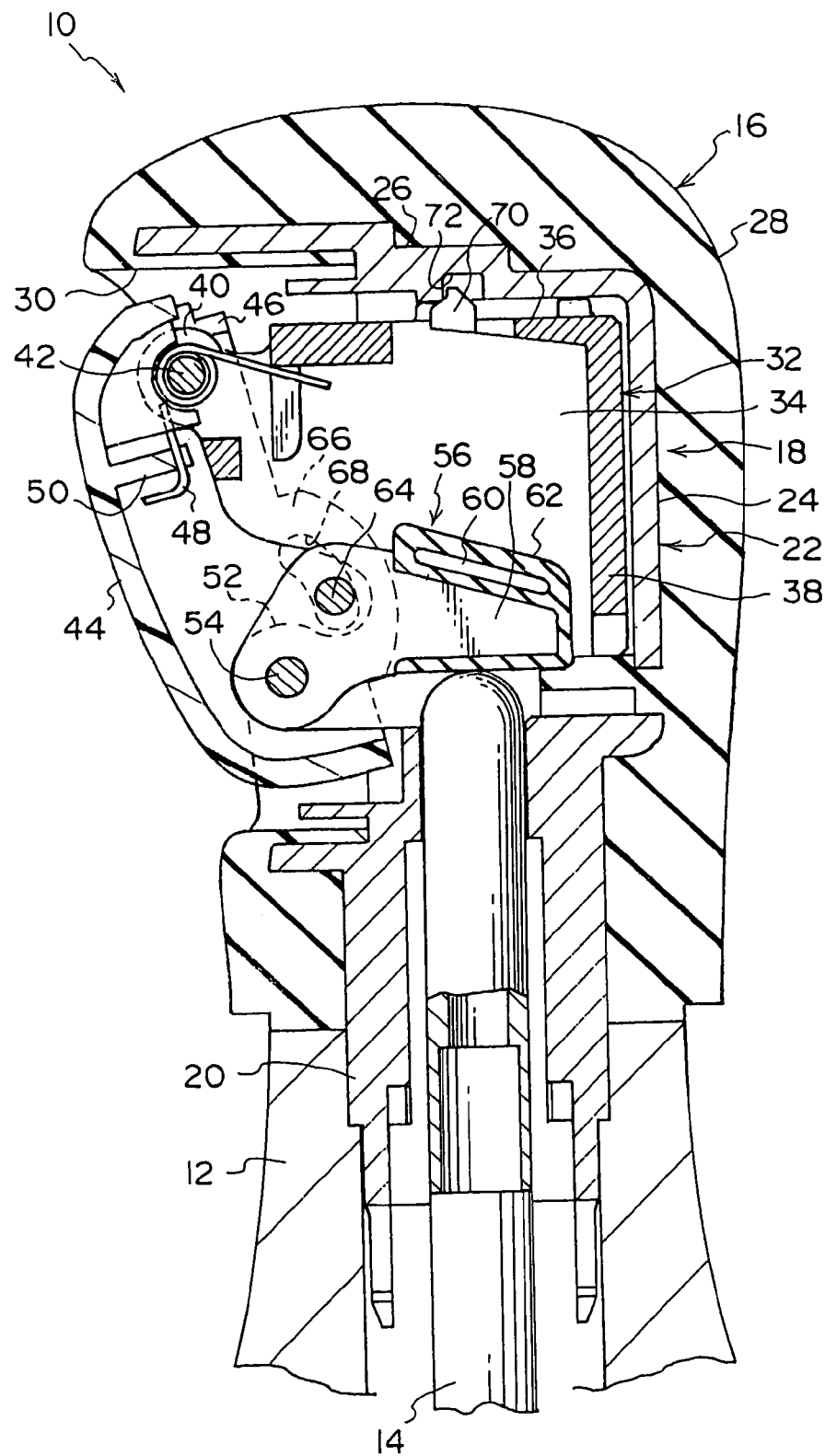
FIG. 3 is a cross-sectional view corresponding to the operating portion (button) shown in FIG. 2 in a state where it is pressed.

On the other hand, when the lever main body 12 is in a state where it has reached the N-position as in the above case, the button 44 provided in the knob 16 resists the urging force of the return spring 48 and presses against it. When the button 44 is made to turn around the shaft 42, the lower end side of the button 44 moves towards the interior side of the knob 16, as shown in FIG. 3. In this manner, when the button 44 turns, the inner walls of the guide grooves 68 move with the button 44 and presses the exterior periphery portion of the engaging pin 64 in the turning peripheral direction of the button 44.

The engaging pin 64 is uniformly connected with both side walls 58 of the link member 56 in the intermediate portion in that longitudinal direction. Furthermore, movement of the engaging pin 64 is limited to turning around the shaft 54 due to the link member 56, which is connected to the engaging pin 64, being supported by the shaft 54. Accordingly, the engaging pin 64, which received pressing force from the inner walls of the guide grooves 68, turns around one direction of the shaft 54 in accompaniment with the link member 56 (i.e., the clockwise direction in FIGS. 2 and 3).

In this manner, when the link member 56 turns in one direction around the shaft 54, the pressing portion 62 provided at the link member 56 resists the urging force of the compression coil spring provided at the inner portion of the lever main body 12 and presses the end piece of the detent rod 14, thereby lowering (i.e., moving) the detent rod 14 towards the base end side of the lever main body 12.

In this manner, the detent pin unified with the detent rod 14 lowers with the lowering of the detent rod 14. Due to this, the opposing state of the protruding portion of the detent hole and the detent pin along the turning direction of the detent pin when the lever main body 12 is made to turn from the N-position to the R-position is cancelled.

Accordingly, when turning the lever main body 12 from the N-position to the R-position in this state, the detent pin avoids the protruding portion of the detent hole and turns. For this reason, the lever main body 12 can move from the N-position to the R-position and the shift range of the automatic transmission can be changed to the reverse range so as to convey the engine driving force to the wheels and make the vehicle reverse.

It should be noted that with the present shift lever 10, it is configured such that the engaging pin 64 accompanies the link member 56 and turns around the shaft 54 by the inner walls of the guide grooves 68 pressing on the exterior periphery portions of the engaging pin 64. The pressing force when the inner walls of the guide grooves 68 press on the exterior periphery portions of the engaging pin 64 faces the axial center side of the engaging pin 64; that is, the pressing force from the inner walls of the guide grooves 68 acts upon the region of the engaging pin 64, perpendicular to the tangential direction in the contact region of the inner walls of the guide grooves 68 and the exterior peripheral portions of the engaging pin 64.

This pressing force is divided between the components in the horizontal direction (i.e., the components facing the inner side of the knob 16 along the opening direction of the opening 30) and the components of the upper and lower directions (i.e., the components facing the upper side of the penetrating direction of the tubular portion 20). However, the components that contribute to the turning of the link member 56 are the components in the horizontal direction. Accordingly, the less increases and decreases in pressing force applied from the inner walls of these guide grooves 68 to the engaging pin 64 to the components in the horizontal direction, the more the amount of force applied to the button 44 can be made to remain constant.

As described above, with the present embodiment, the guide grooves 68 are curved from one end to another in the longitudinal direction with a predetermined curvature with a predetermined region of the opening 30 side as the center. Due to this, even if the guide grooves 68 turn with the turning of the button 44, the tangential direction at the contact region of the inner walls of the guide grooves 68 and the exterior portions of the engaging pin 64 either do not change or the degree in change in tangential direction is small.

For this reason, the ratio of change between the components of the upper and lower directions of pressing force that the inner walls of the guide grooves 68 apply to the engaging pin 64 to the components in the horizontal direction can be made to be small. Due to this, the amount of force necessary when turning the button 44 from commencement of pressing of the button 44 until the time of completion can be made to remain constant.

Moreover, with the present embodiment, enlargement of the knob 16 can be suppressed just by curving the guide grooves 68 and it is not necessary to greatly change the distance from the shaft 42, which is the turning axial center of the button 44, to the contact region of the engaging pin 64 and the inner walls of the guide grooves 68.

Furthermore, the above-described effect can be obtained even if the guide grooves 68 have a rectilinear design simply by curving the guide grooves 68. For this reason, it is easy to apply with a conventional shift lever 10, thus making large design changes unnecessary and achieving low costs.

The present embodiment was configured so as to suppress changes in the tangential direction in the contact region of the inner walls of the guide grooves 68 and the exterior periphery portion of the engaging pin 64. Nonetheless, the present invention is not limited to a configuration that suppresses change in the above-discussed tangential direction.

For example, the return spring 48 and the compression coil spring are characterized in that they increase the urging force along with the amount of change in the shape. In other words, when applying this to the present invention, if the button 44 is pressed and turned, the urging force of the return spring 48 increases, or when lowering the detent rod 14 the urging force of the compression coil spring increases.

The urging force of this type of urging member was considered, and the inclination in the up or down direction relative to the horizontal direction of the above-described tangential direction becomes greater as the button 44 is pressed and made to turn. It can be configured such that the amount of pressing of the horizontal direction components that the inner walls of the guide grooves 68 apply to the exterior portions of the engaging pin 64 is increased.

Moreover, in the present embodiment, the configuration is such where the guide grooves 68 are formed at the button 44 and the engaging pin 64 provided at the link member 56, however, the present invention can be configured such that the guide grooves 68 are formed at the link member 56 and the engaging pin 64 provided at the button 44.

As explained above, increases in the size of the knob can be suppressed with the shift lever of the present invention, and furthermore, the weight felt when the operating unit is operated and pressed can be set to a proper amount.

What is claimed is:

1. A shift lever that operates a transmission by moving a hollow-shaped lever main body whose distal end is open comprising:

a knob having an interior and exterior, which is mounted on the distal end portion of the lever main body, having an opening portion;

a moving body, provided in the interior of the lever main body, movable in a longitudinal direction of the lever main body where one end protrudes from the opening of the lever main body and is placed in the interior of the knob;

an operating unit, at least one part of which is accommodated in the opening portion of the knob, that is movable in the interior and exterior directions relative to the knob;

a link member having a distal end disposed over said protruding end of said moving body and a base end and provided in the knob turnably around an axis that is the center of a predetermined region of the base end side;

an engaging pin provided at any one of the operating unit and the link member; and an arcuate guide groove provided such that the engaging pin can be placed in the other of any one of the operating unit and the link member, where one end in the longitudinal direction and an opposite end are closed; wherein the engaging pin moves from one longitudinal end side to the opposite end side of the arcuate guide groove in a curved or bent path with the movement of the operating unit, and the distal end side presses one end of the moving body and moves the moving body by the link member turning in one turning direction around the axis by the movement of the engaging pin.

2. The shift lever of claim 1, wherein the distal end of the link member is covered by a pressing portion that presses the moving body by engaging one end of the moving body.

3. The shift lever of claim 2, wherein the pressing portion comprises a synthetic resin material.

4. The shift lever of claim 1, wherein the operating unit is axially supported so as to be turnable inside the knob and which turns when pressed, and the link member, with that movement, turns towards the direction opposite of the turning direction of the operating unit and engages one end of the moving body.

5. The shift lever of claim 1, wherein the opening portion of the knob is provided in a direction that intersects the direction of movement of the moving body.

6. The shift lever of claim 1, further comprising an urging member that urges the operating unit towards the exterior side direction of the knob.

7. The shift lever of claim 1, wherein the link member is formed to be curved in the approximate central portion thereof in the longitudinal direction.

8. The shift lever of claim 1, wherein the curvature of the arcuate guide groove is selected such that the amount of force necessary to turn the operating unit and move the engaging pin to move the distal end side of the link member against said end of said moving body remains substantially constant throughout a turning stroke of the operating unit.

9. The shift lever of claim 1, wherein the distal side end of the link member continuously engages the protruding end of the moving body throughout a turning stroke of the operating unit.

10. A shift lever that operates a transmission by moving a hollow-shaped lever main body whose distal end is open comprising:
  a knob having an interior and an exterior, which is mounted on the distal end portion of the lever main body, having an opening portion;
  a moving body movably arranged in the interior of the lever main body, one end of which is urged so as to protrude from the opening of the lever main body;
  a supporting body that is accommodated within the opening portion of the knob and which has a pair of first supporting pieces and a pair of second supporting pieces protruding towards the opening of the opening portion;
  a link member having a distal end and a base end where the second supporting pieces are axially supported to be turnable in the base end side and where the distal end is arranged so as to be engageable with the protruding portion of the moving body;
  an operating unit, which is axially supported by the first supporting pieces, at least one part of which is accommodated in the opening portion, and provided so as to be turnable in the interior and exterior directions of the knob relative to the knob;
  an engaging pin provided at any one of the operating unit and the link member;
  an arcuate guide groove provided such that the engaging pin can pass through the other of any one of the operating unit and the link member, where one end in the longitudinal direction and an opposite end are closed; wherein
  the engaging pin moves from one longitudinal end side to the opposite end side of the arcuate guide groove in a curved or bent path with the movement of the operating unit, and the distal end side presses one end of the moving body and moves the moving body by the link member turning in one turning direction around the axis by the movement of the engaging pin.

11. The shift lever of claim 10, wherein the tip of the link member is covered by a pressing portion that presses the moving body by engaging one end of the moving body.

12. The shift lever of claim 11, wherein the pressing portion comprises a synthetic resin material.

13. The shift lever of claim 10, wherein the operating unit turns by being pressed and the link member, with that movement, turns towards the direction opposite of the turning direction of the operating unit and engages one end of the moving body.

14. The shift lever of claim 10, wherein the opening portion of the knob is provided in a direction that intersects the direction of movement of the moving body.

15. The shift lever of claim 10, further comprising an urging member that urges the operating unit towards the exterior side direction of the knob.

16. The shift lever of claim 10, wherein the link member is formed to be curved in the approximate central portion thereof in the longitudinal direction.

17. The shift lever of claim 10, wherein a curvature of the arcuate guide groove is selected such that the amount of force necessary to turn the operating unit and move the engaging pin to move the distal end side of the link member against the protruding end of the moving body remains substantially constant throughout a turning stroke of the operating unit.

18. The shift lever of claim 10, wherein the distal side end of the link member continuously engages the protruding end of the moving body throughout a turning stroke of the operating unit.

* * * * *